US00RE40038E

(19) United States
(12) Reissued Patent
Shakiba

(10) Patent Number: US RE40,038 E
(45) Date of Reissued Patent: Jan. 29, 2008

(54) LATCH-UP RECOVERY IN QUANTIZED FEEDBACK DC RESTORER CIRCUITS

(75) Inventor: Mohammad Hossein Shakiba, Richmond Hill (CA)

(73) Assignee: Gennum Corporation, Burlington (CA)

(21) Appl. No.: 10/959,947

(22) Filed: Oct. 7, 2004

Related U.S. Patent Documents

Reissue of:
(64) Patent No.: 6,463,108
Issued: Oct. 8, 2002
Appl. No.: 09/277,758
Filed: Mar. 29, 1999

(30) Foreign Application Priority Data

Apr. 3, 1998 (CA) ..... 2234037

(51) Int. Cl.
*H04L 25/10* (2006.01)
*H04L 27/08* (2006.01)

(52) U.S. Cl. ..... 375/319; 375/345; 455/234.1; 327/307; 327/312

(58) Field of Classification Search ..... 375/284, 375/285, 317, 319, 340, 346, 350, 345; 455/63, 455/230, 231, 232.1, 234.1; 327/306, 307, 327/310, 311, 312, 317, 323; 329/318, 319, 329/349, 350
See application file for complete search history.

(56) References Cited

U.S. PATENT DOCUMENTS

| | | | |
|---|---|---|---|
| 4,513,320 | A | 4/1985 | Reneau et al. |
| 5,315,270 | A | 5/1994 | Leonowich |
| 5,424,881 | A | 6/1995 | Behrens et al. |
| 5,426,389 | A | 6/1995 | Webster |
| 5,991,107 | A | 11/1999 | Behrens et al. |
| 6,002,717 | A | 12/1999 | Gaudet |
| 6,118,815 | A | 9/2000 | Hirth et al. |
| 6,204,787 | B1 | 3/2001 | Baird |

FOREIGN PATENT DOCUMENTS

| | | |
|---|---|---|
| EP | 0 320 022 | 6/1989 |
| EP | 0 393 633 | 10/1990 |
| WO | WO 98 45955 | 10/1998 |

OTHER PUBLICATIONS

Baker, A.J.,: "An Adaptive Casble Equalizer for Serial Digital Video Rates to 400 Mb/s", IEEE ISSCC, pp. 174–175, (1996).

Gabara, T.J. et al., "Captive Coupling and Quantized Feedback Applied to Conventional CMOS Technology", IEEE Journal of Solid–State Circuits, vol. 32, No. 3, Mar. 1, 1997, pp. 419–427, New York, U.S.A.

*Primary Examiner*—Dac V. Ha
(74) *Attorney, Agent, or Firm*—Bereskin & Parr

(57) ABSTRACT

A method and apparatus for avoiding and or recovering from the latch-up condition in a quantized feedback DC restorer circuit for use in a digital data communication system receiver. An automatic gain control (AGC) circuit controls the level of the received data by comparing the AGC output with a quantized output signal from the DC restorer. A carrier detect circuit detects the presence of data transitions in the quantized output signal, and in the absence of such transitions continuously ramps up the gain of the AGC until such transitions are detected. The carrier detect circuit can be further used to disable, either entirely or partially, the positive feedback path of the DC restorer in the absence of transition in the quantized output signal. The present invention further provides an inherent muting function of the DC restorer output signal in the absence of valid data transitions.

22 Claims, 5 Drawing Sheets

LATCH-UP RECOVERY IN QUANTIZED FEEDBACK DC RESTORER CIRCUITS

Matter enclosed in heavy brackets [ ] appears in the original patent but forms no part of this reissue specification; matter printed in italics indicates the additions made by reissue.

FIELD OF THE INVENTION

The present invention relates to the field of serial digital data communication systems. In particular, the present invention relates to latch-up avoidance and recovery in a serial digital data receiver using a quantized feedback DC restorer.

BACKGROUND OF THE INVENTION

In a digital data communication system the transmitted data is generally attenuated and distorted by the medium and the AC coupling networks through which it is transmitted. This results, among other things, in a loss of the low frequency and DC components in the received data.

To combat this problem, receivers typically include a DC (direct current) restorer to restore or regenerate the low frequency and DC components of the transmitted input, and an automatic gain control (AGC) circuit which automatically changes the gain or amplification of the received input to maintain the level of the amplified signal essentially constant despite variations in input signal strength.

DC restorer circuits are generally implemented as either a clamping DC restorer or a DC restorer based on the principle of quantized feedback (QFB). Both clamping and quantized feedback restorer circuits are described in detail in U.S. Pat. No. 5,426,389, the description of said patent being incorporated herein by this reference. A QFB DC restorer circuit generally exhibits superior noise and jitter performance, however such circuits are susceptible to latching-up if the output of the restorer is in the incorrect state at the onset of data transmission. Prior art methods of overcoming the latch-up problem involve additional start-up circuitry and/or deviations in the QFB structure, and, as a result, require supplementary circuitry and exhibit inferior circuit performance.

Further, an important criteria in designing a QFB DC restorer is the delay which occurs in the feedback loop. Since any delay in the feedback loop of the QFB restorer adversely affects the construction of the signal spectrum at the input of the slicer of the restorer, delay should be kept at a minimum level. In particular, at high data rates, elegant and efficient circuit implementation techniques are critical for keeping the QFB circuit as simple as possible.

SUMMARY OF THE INVENTION

[In one aspect, the present invention is a circuit for receiving an input signal and providing a quantized output signal in response, said quantized output signal being at either a first level or a second level, and said input signal being substantially at either said first level or said second level, said circuit comprising: (a) an automatic gain control (AGC) circuit for providing a gain signal which processes said input signal to output a controlled signal having a constant amplitude at either said first level or said second level, said AGC circuit being operative in a first mode to provide said gain signal in response to the difference between the level of said controlled signal and the level of said quantized output signal; (b) a restorer circuit coupled to said AGC circuit for receiving said controlled signal and for providing a quantized output signal in response; (c) a carrier detect circuit coupled to said AGC circuit and having an input for receiving said quantized output signal, said carrier detect circuit providing a detection signal for indicating the presence of a transition in the level of said quantized output signal, said detection signal being coupled to said AGC circuit; such that during periods when said detection signal indicates that there are transitions in the level of said quantized output signal, said AGC circuit is operative in said first mode, and during periods when said detection signal indicates that there are no transitions in the level of said quantized output signal, said AGC circuit is operative in a second mode wherein said gain signal is continually increased, at least to a predetermined level.]

*In one aspect, the present invention is a circuit for receiving an input signal and providing a quantized output signal in response. The circuit comprises an amplifier for providing a controlled signal in response to the input signal and a gain signal; a restorer circuit coupled to the amplifier, the restorer circuit including an internal feedback path; a carrier detect circuit having an input for receiving the quantized output signal, the carrier detect circuit providing a first detection signal and a second detection signal for indicating the presence of a transition in the level of the quantized output signal; and, an automatic gain control (AGC) circuit coupled to the amplifier, the restorer circuit and the carrier detect circuit for providing the gain signal in response to the controlled signal, the quantized output signal and the first detection signal. The circuit further comprises a feedback disabling circuit coupled to the carrier detect circuit and the restorer circuit for controllably enabling and disabling the internal feedback path in response to the second detection signal.*

In another aspect of the present invention, said restorer circuit comprises: (a) a high-pass filter circuit for receiving said controlled signal and providing a high-pass filtered controlled signal in response; (b) a low-pass filter circuit for receiving said quantized output signal and providing a low-pass filtered quantized output signal in response, said low pass filter circuit providing a feedback path for said low-pass filtered quantized output signal; (c) a summer for adding said high-pass filtered controlled signal with said low-pass filtered quantized output signal to provide a slicer input signal; and (d) a slicer circuit for comparing said slicer input signal to a slicer reference signal and providing said quantized output signal at a slicer output terminal in response.

*In another aspect, the present invention provides a method for avoiding a latch-up condition in the output of a digital data communication receiver which receives an input signal and provides a quantized output signal in response. The quantized output signal is either at a first level or a second level, and the input signal is substantially at either the first level or the second level. The receiver comprises an automatic gain control circuit, a quantized feedback DC restorer circuit, a carrier detect circuit and a feedback disabling circuit. The method comprises:*

*(a) processing the input signal in response to a gain signal to provide a controlled signal having a constant amplitude at either the first level or the second level, the gain signal being responsive in a first manner to the difference between the level of the controlled signal and the level of the quantized output signal;*

*(b) selectively restoring the DC and low frequency components of the controlled signal to provide the quan-*

*tized output signal by isolating the DC and low frequency components in the quantized output signal and summing the isolated DC and low frequency components into the controlled signal or a version thereof through a feedback path which may be controllably enabled or disabled; and,*

(*c*) *detecting the presence of a transition in the level of the quantized output signal;*

*such that during periods when there are transitions in the level of the quantized output signal, the gain signal is responsive in the first manner and the feedback path is enabled, and during periods when there are no transitions in the level of the quantized output signal, the gain signal is responsive in a second manner wherein the gain signal continually increases to at least a predetermined value and the feedback path is at least partially disabled.*

[Thus, in further aspects of the present invention, said low pass filter circuit includes a disabling circuit responsive to said detection signal or a version thereof, so that said disabling circuit disables said feedback path, either entirely or partially, during periods when said detection signal indicates that there are no transitions in the level of said quantized output signal.]

*In further aspects of the present invention, the disabling circuit is responsive to said detection signal or a version thereof, so that said disabling circuit disables said internal feedback path, either entirely or partially, during periods when said detection signal indicates that there are no transitions in the level of said quantized output signal.*

BRIEF DESCRIPTION OF THE DRAWINGS

In the accompanying drawings which illustrate a preferred embodiment of the invention.

DETAILED DESCRIPTION OF THE INVENTION

Figure 1:
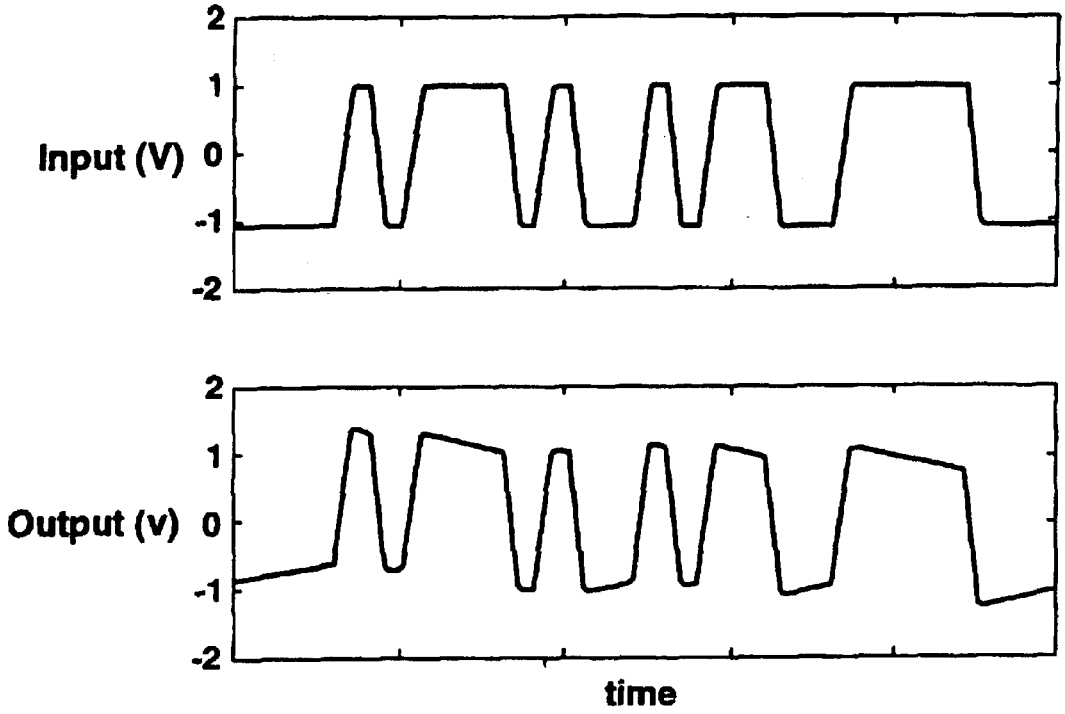
FIG. 1 illustrates the effect of zero-wander.
Figure 2:
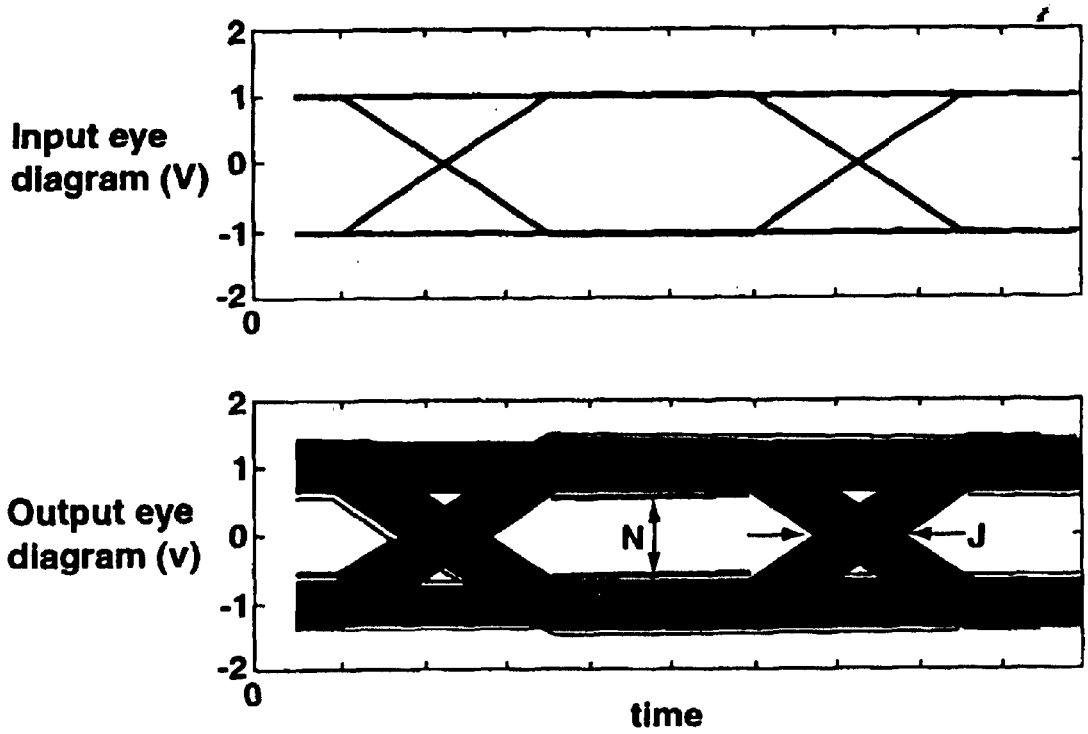
FIG. 2 shows the input and output eye diagrams in a digital data communication system.

In a serial digital data communication system, when the signal passes through a high-pass filter (such as an AC-coupling network which, for example, might be present between a transmitter and a transmission line) it loses its low-frequency components and experiences the "zero-wander" effect. Zero wandering is illustrated in FIG. 1, and can cause serious problems in signal detection since the effective zero of the signal (defined as the signal zero crossing) drifts. As a result of this drift, the noise margin is reduced. Furthermore, in the presence of non-zero rise and fall times in the signal, which are always present in practice, the drift in zero crossing translates into timing jitter and closes the eye diagram (i.e decreases the noise margin) of the signal. FIG. 2 illustrates the concepts of noise margin N and jitter J in a data communication system, in terms of the input and output eye diagrams.

Figure 3:
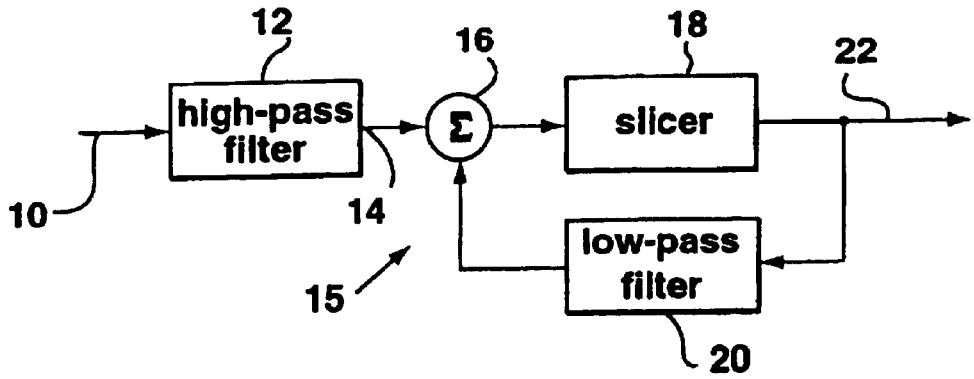
FIG. 3 (prior art)
FIG. 3 illustrates the general concept of DC restorer based on quantized feedback.
Figure 3A:
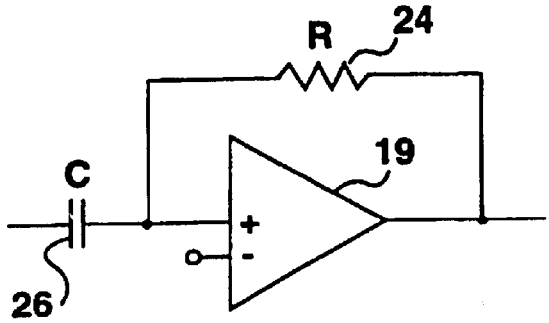
FIG. 3A (prior art)
FIG. 3A shows a typical implementation of a QFB DC restorer circuit (QFB).

To overcome the aforementioned problems, the lost low-frequency components of the high-pass filtered signal must be recovered and added to the signal before it is applied to a slicer for final detection. FIG. 3 illustrates the prior art technique of using a DC restorer 15 based on quantized feedback (QFB) in which the low frequency spectrum from the sliced output 22 is recovered at 20 and then fed back to the input, where it is added at 16 to the high-passed signal 14. Because the quantized output of the DC restorer is quantized at specific levels, it contains DC and low frequency components which were previously lost in the input 10. A typical implementation of a QFB DC restorer 15 is shown in FIG. 3A and includes a comparator 19. The combination of feedback resistance 24 and input capacitor 26 comprise both the low pass filter 20 in the feedback path and the high pass filter 12. As will be appreciated by those skilled in the art, applying the principle of superposition to the circuit of FIG. 3A reveals that a low pass filtered version of the output signal 22 and a high pass filtered version of the input 10 are present at the non-inverting terminal of the comparator 19. The comparator 19 slices this signal at the non-inverting terminal based on a reference slicing signal (not shown) which is connected to the inverting input of the comparator.

Referring to FIG. 3, in steady-state operation, when the signal 22 is properly sliced, the feedback mechanism compensates or the loss in the incoming feed-forward signal 14 (i.e. the input signal 10 after having passed through high-pass filter 12) provided that the time constant of the low-pass filter 20 in the feedback path matches that of the high-pass filter 12 in the feed-forward path, and provided that the input 10 and output 22 voltage swings are equal. Also, to combat the effect of other high-pass filtering, such as external AC-couplings, the cut-off frequency of the above filters must be set to a value such that it dominates over the other high-frequency filtering, e.g. AC-couplings, in the communication system. In other words, the high-pass filter 12 has a higher cut-off frequency than any other high-pass filter.

One major drawback of the QFB approach, which has limited its use in practice, is the possibility of the occurrence of a latch-up. A latch-up occurs when the quantized output from the slicer 18 is at the wrong level at the onset of data transmission. Since a DC restorer based on QFB is a decision-directed detector, its correct operation depends on its initial state at the onset of data transmission. Because the level of the output 22 of the slicer 18 is fed back to be added with the high pass filtered input signal 14, the transitions in the input signal 10 may never be able to change the state of the slicer, and, as a result, the operation of the DC restorer may fail. Prevention methods proposed so far have been based on either employing additional start-up circuits or deviating the QFB structure: A. J. Baker, "An Adaptive Cable Equalizer for Serial Digital Video Rates to 400 Mb/s," I E E E ISSCC, pp. 174–175, (1996); J. Gabara and W. C. Fischer, "Capacitive Coupling and Quantized Feedback Applied to Conventional CMOS Technology," IEEE JSSC, pp. 419–427, Vol. 32, No. 3, Mar. 1997. Unfortunately, such solutions result in further complexities and/or in sacrifices to the performance of the QFB DC restorer circuit.

Figure 4:
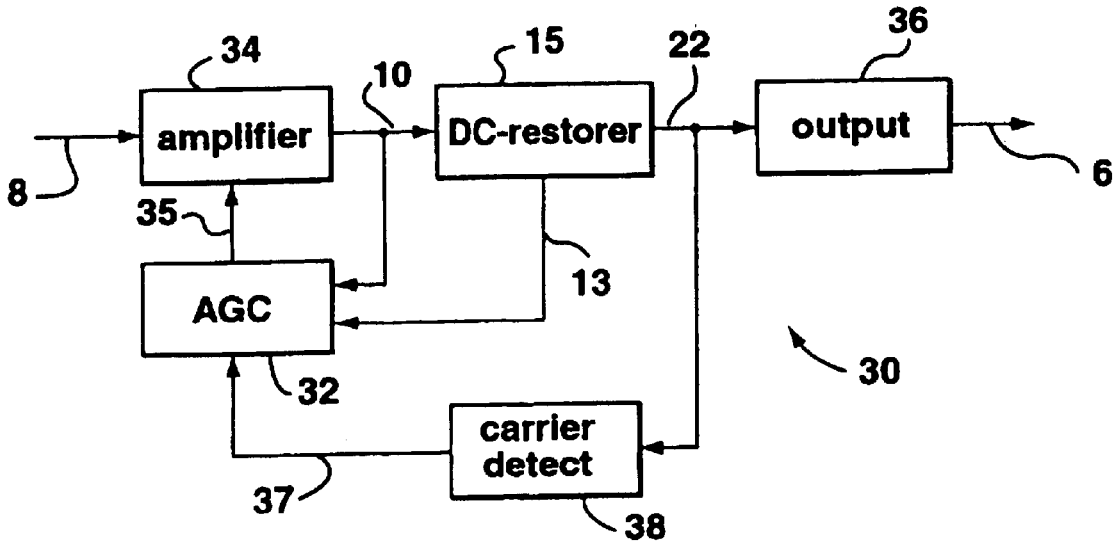
FIG. 4 (prior art)
FIG. 4 is a block diagram of a serial digital data receiver.
Figure 5A:
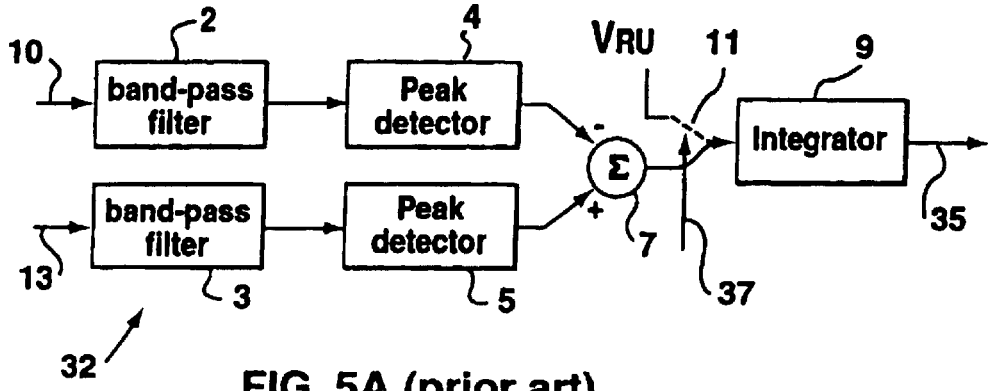
FIG. 5A (prior art)
FIG. 5A shows a typical block diagram for an AGC unit.

FIG. 4 shows a prior art simplified base-band equivalent block diagram of a known serial digital data communications receiver 30 with input 8 and output 6. In known manner, the automatic gain control (AGC) loop circuit which includes AGC unit 32 and amplifier 34, ensures that the amplified input signal 10 is amplified to a preset level by adjusting the gain in an amplitude-sensing feedback loop. As is well known in the art, when the input signal amplitude is controlled by an AGC function the amplitude of a DC restorer input signal is typically compared to the amplitude of a quantized reference signal and the difference, which is the AGC error signal, can be used to control the gain provided by the AGC circuit (i.e. by amplifier 34). A typical implementation of the AGC unit 32 is shown in FIG. 5A. The amplified signal 10 and reference signal 13 are filtered (at 2 and 3 respectively) and then rectified (at 4 and 5 respectively) to generate DC voltages which correspond to the signal amplitudes. The difference is then obtained by subtracting these amplitudes at unit 7. The output of unit 7 is fed to an integrator 9 which adjusts the gain of the amplifier to the optimum level. At this level, the amplifier has just enough gain to force the error signal to zero.

Referring to FIGS. 4 and 5A, in generating the AGC reference signal at the start of data transmission, a carrier detect circuit 38 is used to monitor the signal 22 and output a detection signal 37 to ramp up the gain of the amplifier 34, i.e. increase it (preferably in a linear manner), until the presence of a transition in the level of the signal 22 is detected. As illustrated in FIG. 5A, to ramp up the gain of the amplifier 34 when the detection signal 37 indicates the absence of transitions in signal 22, a switch 11 has been employed in the AGC block 32 to open the AGC loop and alternately direct a (ramp-up) DC voltage $V_{RU}$ to the input of the integrator 9. In this alternate mode of AGC operation, the integrator output starts to ramp up and increases the gain of the amplifier 34 until a transition is detected in signal 22 and detection signal 37 forces switch 11 to reconnect the output of unit 7 to the integrator 9. At this point the AGC is switched to its normal mode of operation, in which the AGC loop is established. In cases where the received signal is below the minimum detectable level, the integrator output continues to increase and eventually saturates and forces the amplifier to work at its maximum gain. As will be appreciated by those skilled in the art, this technique of ramping up the amplifier gain avoids the potential for latch-up of the AGC circuit at the onset of data transmission.

The amplifier 34 is not restricted to having a flat response, and could also shape the frequency spectrum of the signal for channel equalization (i.e. as an equalizer). Due to matching requirements, it is common practice to use either an intermediate signal 13 or the final output of the DC restorer 22 to generate the reference signal for the AGC circuit: A. J. Baker, "An Adaptive Cable Equalizer for Serial Digital Video Rates to 400 Mb/s," IEEE ISSCC, pp. 174–175, (1996). In the illustrated embodiment of FIG. 4, the reference signal is the signal 13, but this could also be the output signal 22 of the DC restorer.

Figure 5B:
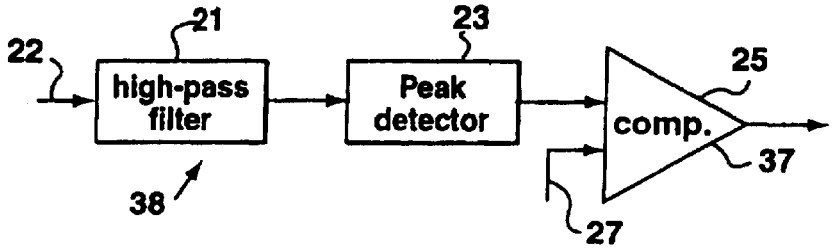
FIG. 5B (prior art)
FIG. 5B shows a block diagram of a carrier detect circuit.

As illustrated in FIG. 5B, the carrier detect circuit 38 typically consists of a high-pass filter 21 for passing the signal transitions, a peak detector 23 which extracts a DC voltage representing the amplitude of the transitions, and a comparator 25 which compares the extracted peak with a carrier-detect threshold level signal 27. In this manner, the output 37 of the comparator 25 indicates whether or not a transition has occurred in the signal 22. The carrier detect output signal 37 controls whether the ramping gain function or mode of the AGC circuit is on or off (i.e. it is on when there are no transitions). The ramping up of the gain of the amplifier 34 commences at power-up of the receiver 30, and it continues until a transition level is detected. For periods during which there is a prolonged absence of data, the amplifier 34 saturates at a maximum gain level. Once a transition has been detected, the reference signal, signal 13 in FIG. 4, is valid and can be used by the AGC unit 32 and amplifier 34, which then switch to a normal mode of operation, to provide the receiver with the optimum amount of gain.

Because of the latch-up potential of QFB DC restorers, this type of DC restorer has not typically been used in the receiver architecture of FIG. 4. As already indicated, when QFB DC restorers have been used, they have either employed additional start-up circuitry or have deviated from the basic QFB structure in attempts to avoid the latch-up of the QFB DC restorer. Also, additional circuitry is may be required to mute the QFB restorer output when the latter does not contain useful information.

Figure 6:
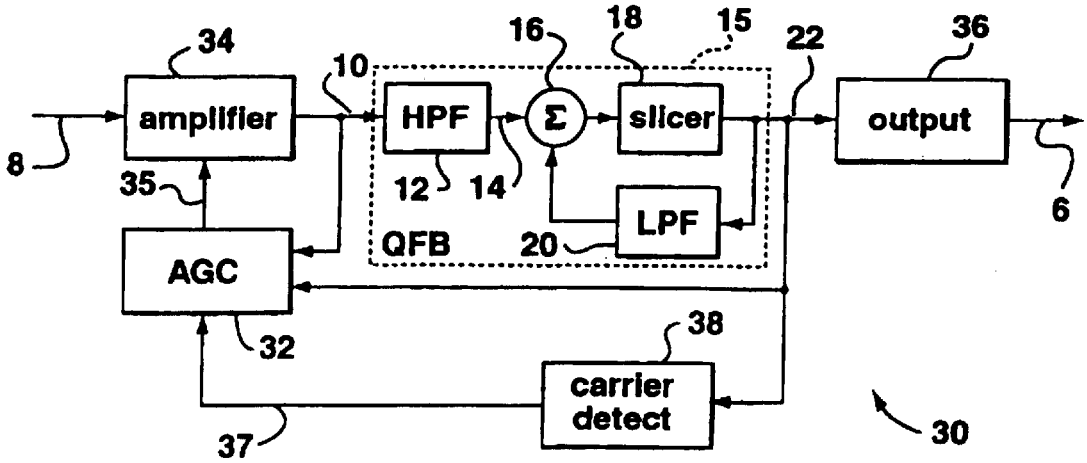
FIG. 6 is a block diagram of a preferred embodiment of the present invention which uses a QFB DC restorer and carrier detection to overcome the latch-up problem.

FIG. 6 shows an embodiment of the present invention which uses a QFB DC restorer, and in which the carefully designed architecture exploits the built-in "mute" function provided by the positive feedback of the QFB circuit and further exploits the AGC latch-up recoverable features which are already present. In the circuit of FIG. 6, the AGC reference signal is the quantized output signal 22 of the QFB DC restorer 15. To illustrate, consider the case in which the quantized output signal 22 is in the wrong state at the onset of data transmission. Since the carrier will not be detected until transitions appear at the output signal 22, and considering the fact that the AGC reference signal is taken from this node, the AGC will continue to ramp up the gain until such transitions are detected. The presence of these transitions in the signal 22 implies that the positive feedback of the QFB restorer, which had initially forced it into the wrong state, has been overcome by the amplified input signal 10. Latch-up prevention is thereby provided, since as soon as a transition is able to pass the QFB restorer, it will force the QFB restorer into the correct state. Furthermore, during the ramp-up time, when the QFB restorer remains in a steady state, the output is quiet or muted since no transition will be allowed to pass through. When both the AGC and QFB circuits have settled, the transitions are passed to the output stage of the DC restorer. Thus, the embodiment of FIG. 6 remains inherently latch-up protected and mutes the output in the absence of valid data transitions, even though there is no additional or supplemental control over the QFB restorer circuit.

While the circuitry of the embodiment of FIG. 6, despite its simplicity, provides both latch-up protection and a built-in mute function, if the input signal has a very heavy high-frequency content, such as in the case of a clock-rate data signal, the amplified signal 10 may never be able to overcome the internal positive feedback of the QFB restorer. In this manner, a latch-up of the QFB restorer may still occur. Such a situation is even more likely to occur if the amplifier bandwidth is minimized to reduce noise, and/or if the received signal 8 is approximately at its minimum detectable level.

Figure 7:
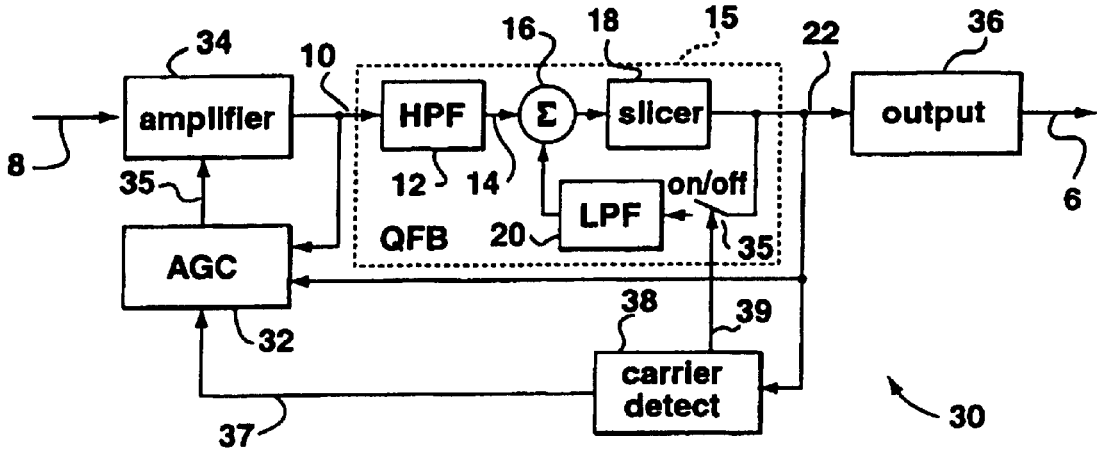
FIG. 7 is a block diagram of another embodiment of the present invention.

FIG. 7 shows another embodiment of the present invention, which further exploits the presence of the carrier detector circuit 38 in the receiver 30. As shown in FIG. 7, in the absence of data transitions the positive feedback (i.e. the low-pass filter 20) of the QFB DC restorer is disabled by a second control signal 39 from the carrier detect circuit, while at the same time the AGC gain is ramping up. (Typically, as will be obvious to one skilled in the art, control signal 37 and control signal 39 are either the same signal or minor variations (i.e. different versions, such as an inverted or amplified version, of the same signal, and thus one signal effectively controls both the positive feedback and the ramping gain function.) As illustrated in FIG. 7, the control signal 39 gates a switch [35] *40* in the positive feedback path of the QFB restorer, so that when no transitions are detected the feedback path of the signal 22 is disabled, i.e. the switch [35] *40* is open. When transitions are detected, the switch 35 closes and thereby enables the feedback path.

In this mode of operation (i.e with disabled feedback), the QFB DC restorer operates as a simple slicer and passes the amplified signal 10 to its output 22. Once a transition in signal 22 occurs (i.e. when input data 8 is present), the QFB DC restorer is switched to its normal mode, with its feedback enabled. The QFB DC restorer is forced, in this case, to start from the proper state, hence preventing or avoiding any latch-up problem. From this point on, and as long as the communication system is not disturbed, the receiver and DC restorer continue to operate in this mode. A drawback of the embodiment of FIG. 7 is, however, that, in the absence of data transitions in the signal 22, the output signal 22 is no longer muted. Since the slicer 18 continues to operate during this time, the output signal 22 will contain oscillations and/or amplified noise. Prior art solutions to this problem require the addition of an additional mute block circuit, which may consequently degrade performance.

While theoretically, it is possible to design the QFB DC restorer circuit of the present invention for proper operation under any set of acceptable constraints, to accommodate for variations in manufacturing when the above concerns are critical, an intermediate solution between the embodiments of FIG. 6 and FIG. 7 can be used. This can be achieved by only partially disabling the positive feedback of the QFB during the AGC ramp-up time, as illustrated conceptually in FIG. 8.

Figure 8:
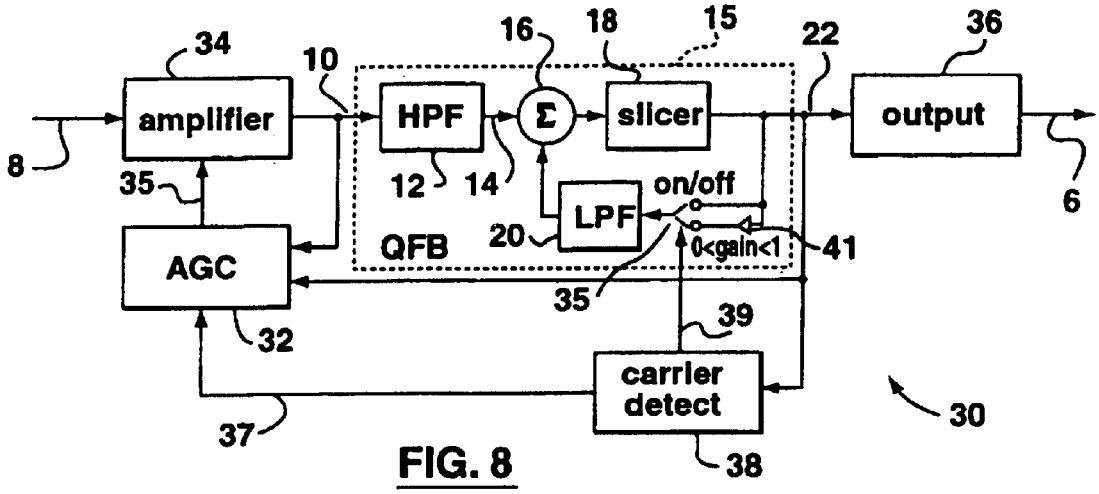
FIG. 8 is a block diagram of an additional embodiment of the present invention.

The description of the circuit of FIG. 8 is similar to that of FIG. 7. The only difference is that the carrier-detect control 39 over the low-pass filter (i.e. positive feedback path) of the QFB restorer can have reduced control at a value between 0 and 1 (instead of being completely disabled as in FIG. 7). This is accomplished by providing a gain (or equivalently an attenuation) to the signal 22 at amplifier 41 which varies between 1 and 0; a gain of 1 corresponds to no feedback disablement/control, and a gain of 0 corresponds to complete feedback disablement/control. As in FIG. 7, control signal 39 determines via switch 35 whether the feedback path operates normally (switch 35' is in the upper position in FIG. 8 and amplifier 41 is bypassed) or whether it is partially disabled (switch [35'] *40* is in the lower position). In this manner, if the amplifier 41 has a gain of 1 (no control/attenuation) this effectively corresponds to the embodiment shown in FIG. 6. On the other hand, if the amplifier 41 has a gain of 0 (full control/attenuation) this effectively corresponds to the embodiment of FIG. 7.

The embodiment of FIG. 8 therefore provides superior latch-up protection for the QFB DC restorer than does the embodiment of FIG. 6, while still providing a muting function for the QFB output. Thus the embodiment of FIG. 8 represents a compromise or trade-off between latch-up protection and muting control.

Figure 9:
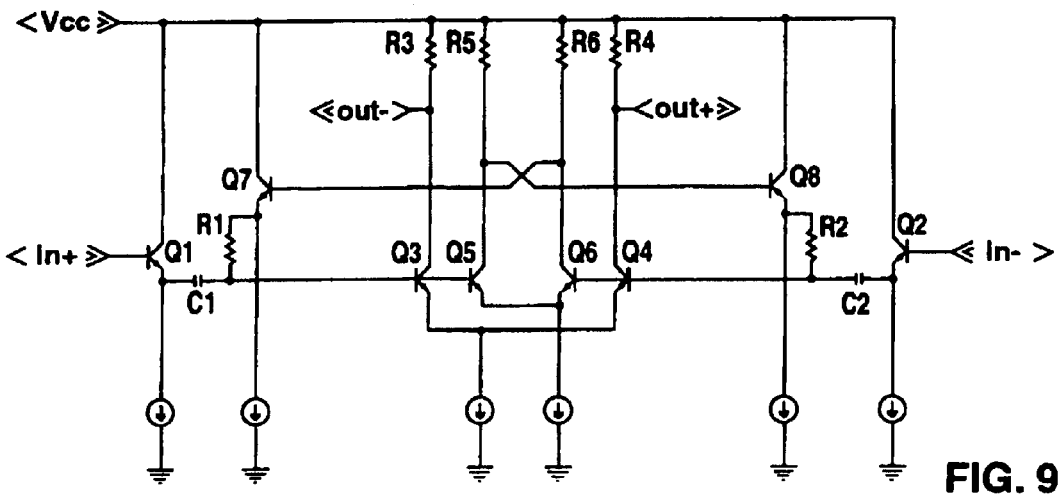
FIG. 9 shows a circuit realization for the embodiment of FIG. 6.

As mentioned previously, simplicity of the QFB circuit is crucial in high data rate applications. Any significant delay in the QFB feedback loop deteriorates its performance due to the addition of timing jitter. FIG. 9 shows a preferable basic circuit realization for the QFB DC-restorer of the embodiment of FIG. 6. Referring to FIG. 9, transistors Q3 and Q4 form the slicer 18, while transistors Q5 and Q6 provide the positive feedback. The feedback loop is completed by buffers Q7 and Q8 and two RC low-pass filters consisting of resistor-capacitor pairs R1-C1 and R2-C2 respectively (note that two filters are used due to the differential configuration of the circuit). The same RC filters are employed to realize the feed-forward high-pass filters through their high-pass ports. This guarantees matching between the cut-off frequencies of the high-pass and low-pass filters. The high-pass ports are supplied by the differential input signal (in+, in−) which is fed to the circuit via the bases of buffers Q1 and Q2. The output is taken from the output of the slicer between terminals out+ and out−, as shown in FIG. 9. This circuit can be used directly in the block diagram of FIG. 6.

Figure 10A:
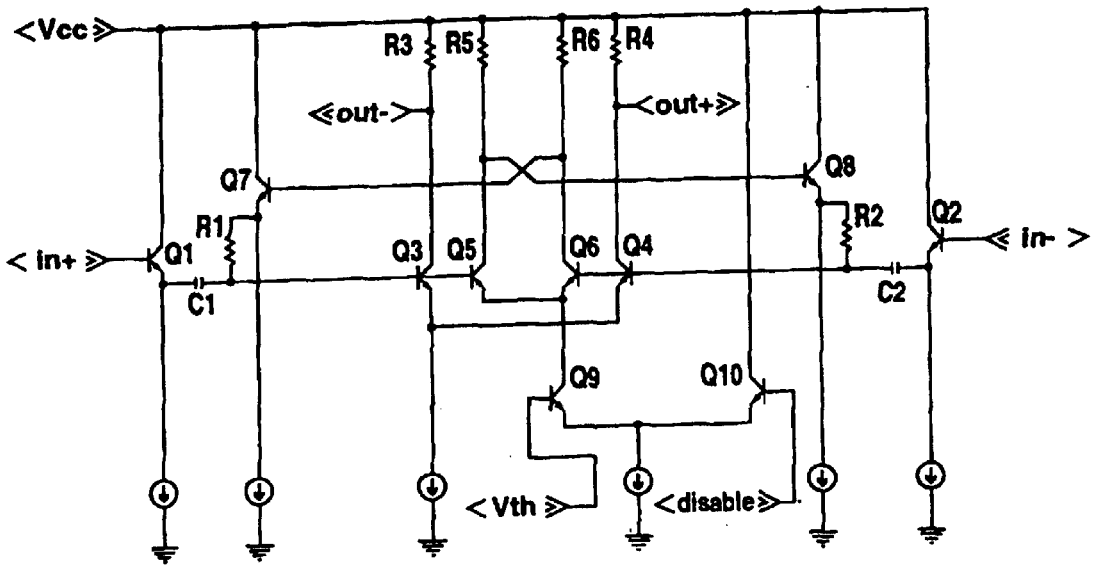
FIG. 10A shows a circuit realization for the embodiment of FIG. 7.
Figure 10B:
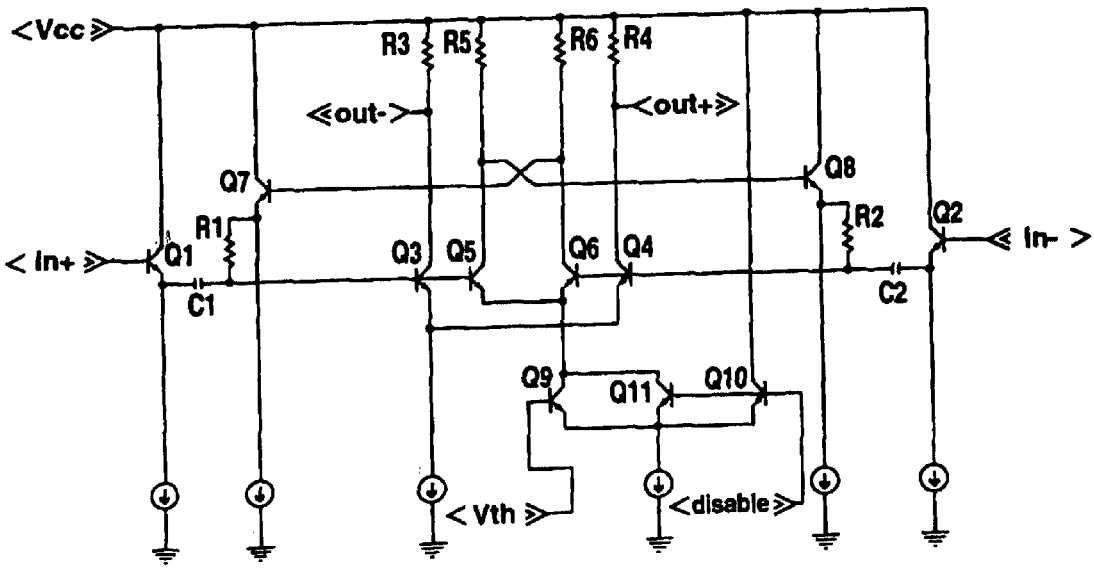
FIG. 10B shows a circuit realization for the embodiment of FIG. 8.

The circuits of FIGS. 10A and 10B are modified versions of the circuit of FIG. 9, which provide for the option of disabling (entirely or partially) the positive feedback around the QFB loop. This is accomplished by adding a switch to bypass (entirely or partially) the biasing current of transistors Q5 and Q6. In either case, this is achieved by adding a few transistors to the circuit of FIG. 9.

With the addition of transistors Q9 and Q10 in the circuit of FIG. 10A, the positive feedback is entirely disabled if the disable control voltage, "disable", is more than the threshold voltage Vth. This alteration therefore makes the circuit of FIG. 10A suitable for use in the block diagram of FIG. 7.

Alternatively, a portion of the biasing current can be bypassed. This can be implemented by adding another transistor to the circuit of FIG. 10A. FIG. 10B shows the result, with transistor Q11 added to the circuit of FIG. 10A. The resulting circuit can be used to implement the block diagram of FIG. 8, in which partial disablement of the QFB restorer's positive feedback is desired, as already discussed. In FIG. 10B the partial disablement of the feedback is turned "on" when the disable control voltage, "disable", is more than the threshold voltage Vth. The extent to which the feedback is disabled is determined by the relative emitter areas of transistors Q10 and Q11, where the amount of disablement equals the ratio of the emitter area of Q11 divided by the sum of the emitter areas of both Q10 and Q11. As will be appreciated by those skilled in the art, by making one or more of the emitter areas of these transistors programmably variable, the circuit of FIG. 8B can be used to provide variable amounts of partial disablement of the QFB DC restorer feedback, as may be required.

Thus, the present invention uses and processes signals which, typically, are already present in the receiver of a data communication system to prevent the latch-up problem in the QFB DC-restorer. This eliminates the overhead of the start-up circuitry. The present invention further provides means of preventing the latch-up problem by exploiting the inherent potentials of the stages preceding the QFB, such as the automatic gain control circuit. This approach again reduces the overhead since such stages are usually present in the system. As a result, the QFB DC restorer used in accordance with the present invention becomes very simple, and hence fast, since either no further latch-up precaution or minimal further precautions are required.

The present invention makes further use of the built-in mute operation of the above embodiments to cut off the output when there is no signal (or when there is a signal which is smaller than the minimum signal the system is designed to handle) at the input of the receiver. This built-in mute function is very valuable, as serial digital data communication systems usually require precautions to be taken in order to avoid suffering from unwanted outputs (such as oscillations or amplified noise) which typically accompany very small input signals. Moreover the present invention is very attractive for use in high data rate communication systems, since, while avoiding latch-up, it can still be designed to minimize delay, depending on the criteria of the specific application.

While preferred embodiments of the present invention have been described, the embodiments disclosed are illustrative and not restrictive, and the scope of the invention is intended to be defined only by the appended claims.

I claim:

[1. A circuit for receiving an input signal and providing a quantized output signal in response, said quantized output signal being at either a first level or a second level, and said input signal being substantially at either said first level or said second level, said circuit comprising:

(a) an automatic gain control (AGC) circuit for providing a gain signal which processes said input signal to output a controlled signal having a constant amplitude at either said first level or said second level, said AGC circuit being operative in a first mode to provide said gain signal in response to the difference between the level of said controlled signal and the level of said quantized output signal;

(b) a restorer circuit coupled to said AGC circuit for receiving said controlled signal and for providing said quantized output signal in response;

(c) a carrier detect circuit coupled to said AGC circuit and having an input for receiving said quantized output signal, said carrier detect circuit providing a detection signal for indicating the presence of a transition in the level of said quantized output signal, said detection signal being coupled to said AGC circuit;

such that during periods when said detection signal indicates that there are transitions in the level of said quantized output signal, said AGC circuit is operative in said first mode, and during periods when said detection signal indicates that there are no transitions in the level of said quantized output signal, said AGC circuit is operative in a second mode wherein said gate signal is continually increased, at least to a predetermined level.]

[2. A circuit according to claim 1 wherein when said AGC circuit is operative in said second mode, said gain signal increases in a substantially linear manner until said gain value reaches said predetermined level.]

[3. A circuit according to claim 2 wherein said predetermined level corresponds to a gain saturation level of said AGC circuit.]

[4. A circuit according to claim 1 wherein said restorer circuit comprises:

(a) a high-pass filter circuit for receiving said controlled signal and providing a high-pass filtered controlled signal in response;

(b) a low-pass filter circuit for receiving said quantized output signal and providing a low-pass filtered quantized output signal in response, said low pass filter circuit providing a feedback path for said low-pass filtered quantized output signal;

(c) a summer for adding said high-pass filtered controlled signal with said low-pass filtered quantized output signal to provide a slicer input signal; and (d) a slicer circuit for comparing said slicer input signal to a slicer reference signal and providing said quantized output signal at a slicer output terminal in response.]

[5. A circuit according to claim 4 wherein the time constant of said high pass circuit and the time constant of said low pass circuit are equal.]

[6. A circuit according to claim 5 wherein the voltage swing of said controlled signal and the voltage swing of said quantized output signal are equal.]

[7. A circuit according to claim 4 wherein said low pass filter circuit includes a disabling circuit responsive to said detection signal or a version thereof, so that said disabling circuit disables said feedback path during periods when said detection signal indicates that there are no transitions in the level of said quantized output signal.]

[8. A circuit according to claim 7 wherein said disabling circuit comprises a feedback enable switch coupled between said slicer output terminal and said summer, said switch being operative in an open or closed position in response to said detection signal or a version thereof.]

[9. A circuit according to claim 4 wherein said low pass filter circuit includes a disabling circuit responsive to said detection signal or a version thereof, so that said disabling circuit partially disables said feedback path during periods when said detection signal indicates that there are no transitions in the level of said quantized output signal.]

[10. A circuit according to claim 9 wherein said disabling circuit comprises a feedback control amplifier coupled between said slicer output terminal and said summer, said feedback control amplifier having a feedback control gain with a value in the range of 0 to 1, said value corresponding to the extent that said feedback path may be partially disabled, said disabling circuit further comprising a feedback enable switch being operative, in response to said detection signal or a version thereof, in a first position to insert said feedback control amplifier in said feedback path and in a second position to bypass said feedback control amplifier in said feedback path.]

[11. A circuit according to claim 10 wherein said feedback control gain value is changeable.]

[12. A circuit according to claim 1, 7, or 9 wherein said carrier detect circuit comprises:

(a) a high-pass filter circuit for receiving said quantized output signal and providing a high pass filtered quantized output signal in response;

(b) a peak detector circuit for receiving said high pass filtered quantized output signal and providing a peak signal representative of the peak amplitude of said high pass filtered quantized output signal in response; and (c) a comparator circuit for comparing said peak signal to a carrier detect threshold signal and outputting said detection signal in response.]

[13. A method for avoiding a latch-up condition in the output of a digital data communication receiver which receives an input signal and provides a quantized output signal in response, said quantized output signal being at either a first level or a second level, and said input signal being substantially at either said first level or said second level, said receiver comprising an automatic gain control circuit, a quantized feedback DC restorer circuit, and a carrier detect circuit, said method comprising the steps of:

(a) processing the input signal in response to a gain signal to provide a controlled signal having a constant amplitude at either said first level or said second level, said gain signal being responsive in a first manner to the difference between the level of said controlled signal and the level of said quantized output signal;

(b) restoring the DC and low frequency components of said controlled signal to provide a quantized output signal; and (c) detecting the presence of a transition in the level of said quantized output signal;

such that during periods when there are transitions in the level of said quantized output signal, said gain signal is responsive in said first manner, and during periods when there are no transitions in the level of said quantized output signal, said gain signal is responsive in a second manner wherein said gain signal continually increases to at least a predetermined value.]

[14. A method according to claim 13 wherein when said gain signal is responsive in said second manner, said gain signal increases substantially linearly until said gain signal reaches said predetermined value.]

[15. A method according to claim 14 wherein step (b) further comprises the steps of:

high-pass filtering said controlled signal to provide a high-pass filtered controlled signal;

low-pass filtering said quantized output signal to provide a low-pass filtered quantized output signal;

adding said low-pass filtered quantized output signal to said high-pass filtered controlled signal to provide a slicer input signal; and comparing said slicer input signal a slicer reference signal and providing said quantized output signal in response.]

[16. A method according to claim 15 wherein said step of low-pass filtering is disabled during periods when said detection signal indicates that there are no transitions in the level of said quantized output signal.]

[17. A method according to claim 15 wherein said step of low-pass filtering is partially disabled during periods when said detection signal indicates that there are no transitions in the level of said quantized output signal.]

*18. A circuit for receiving an input signal and providing a quantized output signal in response, said circuit comprising:*

*(a) an amplifier for providing a controlled signal in response to said input signal and a gain signal;*

*(b) a restorer circuit coupled to said amplifier, said restorer circuit including an internal feedback path;*

*(c) a carrier detect circuit having an input for receiving said quantized output signal, said carrier detect circuit providing a first detection signal and a second detection signal for indicating the presence of a transition in the level of said quantized output signal;*

*(d) an automatic gain control (AGC) circuit coupled to said amplifier, said restorer circuit and said carrier detect circuit for providing said gain signal in response to said controlled signal, said quantized output signal and said first detection signal; and*

*(e) a feedback disabling circuit coupled to said carrier detect circuit and said restorer circuit for controllably enabling and disabling said internal feedback path in response to said second detection signal.*

*19. A circuit according to claim 18, wherein said restorer circuit comprises:*

*(i) a high-pass filter circuit for receiving said controlled signal and providing a high-pass filtered controlled signal in response;*

*(ii) a low-pass filter circuit for receiving said quantized output signal and providing a low-pass filtered quantized output signal in response, said low-pass filter circuit providing said internal feedback path for said low-pass filtered quantized output signal;*

*(iii) a summer for adding said high-pass filtered controlled signal with said low-pass filtered quantized output signal to provide a slicer input signal; and*

*(iv) a slicer circuit for comparing said slicer input signal to a slicer reference signal and providing said quantized output signal at a slicer output terminal in response.*

*20. A circuit according to claim 19, wherein the time constant of said high-pass filter circuit and the time constant of said low-pass filter circuit are equal.*

*21. A circuit according to claim 20, wherein said feedback disabling circuit includes a switch coupled between said slicer circuit and said summer, said switch having a first state and a second state, wherein in said first state, said switch is fully open to disable said internal feedback path and wherein in said second state, said switch is fully closed to enable said internal feedback path.*

*22. A circuit according to claim 21, wherein said switch is in said first state when said second detection signal does not indicate the presence of a transition and is in said second state when said second detection signal indicates the presence of a transition.*

*23. A circuit according to claim 20, wherein said feedback disabling circuit includes a feedback control amplifier coupled between said slicer circuit and said summer, said feedback control amplifier having a gain between 0 and 1, wherein said gain corresponds to the extent to which said internal feedback path is enabled.*

*24. A circuit according to claim 23, wherein said feedback disabling circuit further includes a switch coupled between said slicer output and said summer, said switch being coupled in parallel with said feedback control amplifier, said switch having a first state and a second state, wherein in said first state, said switch inserts said feedback control amplifier into said internal feedback path and wherein in said second state, said switch bypasses said feedback control amplifier from said internal feedback path.*

*25. A circuit according to claim 24, wherein said switch is in said first state when said second detection signal does not indicate the presence of a transition and is in said second state when said second detection signal indicates the presence of a transition.*

*26. A circuit according to any one of claims 23, 24 or 25, wherein said gain of said feedback control amplifier may be varied.*

*27. A circuit according to claim 18, wherein said first detection signal and said second detection signal are identical.*

*28. A circuit according to claim 18, wherein said second detection signal is a version of said first detection signal.*

*29. A circuit according to claim 18, wherein said AGC may be operative in a first mode when said first detection signal indicates that there is a transition in the level of said quantized output signal or in a second mode when said first detection signal indicates that there is no transition in the level of said quantized output signal, and wherein in said first mode, said gain signal corresponds to a difference between said controlled signal and said quantized output signal and wherein in said second mode said gain signal is continually increased, at least to a predetermined level.*

*30. A circuit according to claim 29, wherein said quantized output signal may be at either a first level or a second level and wherein said input signal is generally at either said first level or said second level.*

*31. A circuit according to claim 29, wherein when said AGC circuit is in said second mode, said gain signal*

*increases in a substantially linear manner until said gain value reaches said predetermined level.*

*32. A circuit according to claim 29, wherein said predetermined level corresponds to a gain saturation level of said AGC circuit.*

*33. A circuit according to claim 29, wherein the voltage swing of said controlled signal and the voltage swing of said quantized output signal are equal.*

*34. A circuit according to claim 18 or 29 wherein said carrier detect circuit comprises:*

*(a) a high-pass filter circuit for receiving said quantized output signal and providing a high pass filtered quantized output signal in response;*

*(b) a peak detector circuit for receiving said high pass filtered quantized output signal and providing a peak signal representative of the peak amplitude of said high pass filtered quantized output signal in response; and*

*(c) a comparator circuit for comparing said peak signal to a carrier detect threshold signal and outputting said detection signal in response.*

*35. A method for avoiding a latch-up condition in the output of a digital data communication receiver which receives an input signal and provides a quantized output signal in response, said quantized output signal being at either a first level or a second level, and said input signal being substantially at either said first level or said second level, said receiver comprising an automatic gain control circuit, a quantized feedback DC restorer circuit, a carrier detect circuit, and a feedback disabling circuit, said method comprising:*

*(a) processing the input signal in response to a gain signal to provide a controlled signal having a constant amplitude at either said first level or said second level, said gain signal being responsive in a first manner to the difference between the level of said controlled signal and the level of said quantized output signal;*

*(b) selectively restoring the DC and low frequency components of said controlled signal to provide said quantized output signal by isolating said DC and low frequency components in said quantized output signal and summing said isolated DC and low frequency components into said controlled signal or a version thereof through a feedback path which may be controllably enabled or disabled; and*

*(c) detecting the presence of a transition in the level of said quantized output signal,*

*such that during periods when there are transitions in the level of said quantized output signal, said gain signal is responsive in said first manner and said feedback path is enabled, and during periods when there are no transitions in the level of said quantized output signal, said gain signal is responsive in a second manner wherein said gain signal continually increases to at least a predetermined value and said feedback path is at least partially disabled.*

*36. A method according to claim 35, wherein step (b) is accomplished by:*

*(i) high-pass filtering said controlled signal to provide a high pass filtered controlled signal;*

*(ii) selectively low-pass filtering said quantized output signal through said feedback path to provide a low-pass filtered quantized output signal,*

*(iii) adding said low-pass filtered quantized output signal to said high-pass filtered controlled signal to provide a slicer input signal; and*

*(iv) comparing said slicer input signal to a slicer reference signal and providing said quantized output signal in response.*

*37. A method according to claim 36, wherein when said gain signal is responsive in said second manner, said gain signal increases substantially linearly until said gain signal reaches said predetermined value.*

*38. A method according to claim 36, wherein said feedback path is partially disabled during periods when said detection signal indicates that there are no transitions in the level of said quantized output signal.*

*39. A method according to claim 36, wherein said feedback path is completely disabled during periods when said detection signal indicates that there are no transitions in the level of said quantized output signal.*

* * * * *